United States Patent
Huijsing et al.

[19]

[11] Patent Number: 6,035,711
[45] Date of Patent: Mar. 14, 2000

[54] DEVICE FOR DETERMINING THE DIRECTION AND SPEED OF AN AIR FLOW

[75] Inventors: Johan Hendrik Huijsing, Schipluiden; Arend Hagedoorn, Arnhem; Bastiaan Willem Van Oudheusden; Huibert Jan Verhoeven, both of Delft, all of Netherlands

[73] Assignee: Mierij Meteo B.V., Netherlands

[21] Appl. No.: 08/981,127

[22] PCT Filed: May 29, 1996

[86] PCT No.: PCT/NL96/00212

§ 371 Date: Apr. 27, 1998

§ 102(e) Date: Apr. 27, 1998

[87] PCT Pub. No.: WO96/38731

PCT Pub. Date: Dec. 5, 1996

[30] Foreign Application Priority Data

May 30, 1995 [NL] Netherlands ............... 1000454

[51] Int. Cl.[7] ....................... G01F 1/68
[52] U.S. Cl. ................... 73/202.5; 73/204.23
[58] Field of Search ............... 73/202, 202.5, 73/204.22, 204.23, 204.24, 204.25, 204.26, 170.11, 170.12

[56] References Cited

U.S. PATENT DOCUMENTS

| | | | |
|---|---|---|---|
| 3,988,928 | 11/1976 | Edstrom et al. | 73/204.23 |
| 4,373,386 | 2/1983 | Schuddemat et al. | 73/189 |
| 4,403,506 | 9/1983 | Lauterbach | 73/202.5 |
| 4,890,489 | 1/1990 | Huijsing | 73/204.24 |
| 5,251,481 | 10/1993 | Huck et al. | 73/204.26 |

FOREIGN PATENT DOCUMENTS

| | | |
|---|---|---|
| 03 131 20 | 4/1984 | European Pat. Off. . |
| 04 0297 7 | 12/1990 | European Pat. Off. . |
| 04 635 491 | 1/1992 | European Pat. Off. . |

OTHER PUBLICATIONS

Patent Abstracts of Japan, vol. 12, No. 319 JP, A 63 085364 (Sharp Corp.) Apr. 15, 1988.
Patent Abstracts of Japan vol. 10, No. 119 JP A 63 247170 (Toshiba KK) Dec. 6, 1985.

*Primary Examiner*—Hezron Williams
*Assistant Examiner*—Helen C. Kwok
*Attorney, Agent, or Firm*—Mark Zovko

[57] ABSTRACT

The invention provides a device for determining the direction and speed of an air flow, comprising a chip which is provided with two mutually perpendicularly positioned pairs of measuring circuits placed at a distance opposite each other, optionally four heating elements in positions coinciding with the measuring circuits and a control circuit, which chip is fixed onto a substrate, characterized in that the mounting between chip and substrate is substantially homogeneous and preferably effected by gluing. The chip is for instance accommodated in a housing of conducting material. The device can contain in addition to the measuring chip a reference chip without heating elements which is embodied in substantially identical manner and which is shielded from the measuring chip by an insulator.

12 Claims, 2 Drawing Sheets

DEVICE FOR DETERMINING THE DIRECTION AND SPEED OF AN AIR FLOW

The present invention relates to a device for determining direction and speed of an air flow, comprising a chip which is provided with two mutually perpendicularly positioned pairs of measuring circuits placed at a distance opposite each other, four heating elements in positions coinciding with the measuring circuits and a control circuit, which chip is fixed onto a substrate.

Such a chip is known for instance from the European patent 0 313 120 in which is described a direction-sensitive flow speed indicator for gaseous or liquid media which contains a semiconductor substrate on which two thermocouples are arranged for each direction component. The thermocouples take the form of a thermopile and lie parallel to each other while the surface between the thermocouples can be used to arrange one or more heating elements and an electronic circuiting for processing the output signals of the thermocouples. The chip is mounted on a substrate along which the air flow is guided. The substrate is heated by means of the heating elements, preferably so-called heating rheostats. Due to the air flowing over the substrate a temperature gradient builds up over the substrate, wherein the lowest temperature occurs where the air flow first makes contact with the substrate while the highest temperature occurs where the air flow leaves the substrate. The gradient is measured by means of the thermocouples and the progress of the gradient is a measure for the flow speed. Because the chip preferably contains four thermocouples placed in a square, the direction of the air flow can also be determined with the same arrangement.

Such a chip is preferably accommodated in a housing, as described for instance in the European patent 0 402 977. This patent describes a device for measuring a speed and direction of a flowing medium which consists of a axis which supports a construction of an upper and a lower, substantially identical circular discs, which discs are fixed at a determined mutual distance perpendicularly of a collective axis. A directionsensitive thermal velocity meter (for instance the chip as described above) is placed on a third disc with a diameter smaller than that of both the other discs, between which the third disc is arranged. The chip faces toward the upper of the two discs.

A number of problems occur with the known device. It is for instance not always possible to obtain an homogeneous temperature distribution in the substrate. Variations can result in disturbances of the gradient and thereby measurement errors. In addition, the temperature fluctuations in the substrate can cause hysteresis in the material surrounding the substrate. Furthermore, ambient factors such as a high outside temperature can affect the measurement values.

The present invention has for its object to provide a device for determining the direction and speed of an air flow which is improved relative to the known devices.

To this end the invention provides a device for determining the direction and speed of an air flow, comprising a chip which is provided with two mutually perpendicularly positioned pairs of measuring circuits placed at a distance opposite each other, one or more preferably four heating elements in positions coinciding with the measuring circuits and a control circuit, which chip is fixed onto a substrate, wherein the mounting between chip and substrate is substantially homogeneous. The homogeneous mounting ensures that the heat which is generated onto the chip by the heating elements is transferred uniformly and homogeneously to the substrate. The substrate is hereby also heated homogeneously and uniformly and a reliable measurement can be performed.

The mounting between the chip and the substrate is preferably effected by gluing. Gluing takes place in a manner such that no air bubbles and other unevenness which could disturb an homogeneous mounting are enclosed. An air bubble does not permit good heat transfer. An air bubble could occur round an unevenness.

The substrate with the chip thereon is preferably accommodated in a housing. This may be any random housing, but recommended according to the invention is an arrangement as described for instance in the European patent 0 402 977, wherein the substrate and the chip are accommodated in a disc which in turn is placed between two larger discs. Due to the continuous heating of the substrate and the uneven cooling thereof hysteresis phenomena can occur in the disc. Preferably therefore the disc according to the invention is embodied in conducting material, of which the coefficient of thermal conductivity is preferably a minimum of 200 W/(m.K). An example of a very suitable material is aluminum. Aluminum has the additional advantage of being corrosion-resistant after treatment.

SUMMARY OF INVENTION

In a preferred embodiment of the invention the device comprises in addition to the measuring chip a reference chip without heating elements which reference chip is substantially identical to the measuring chip. The reference chip measures the ambient temperature and ensures that the measuring chip always heats the substrate to a determined value above this ambient temperature. In this way the ambient temperature no longer affects the measurement because there will always be a clear difference between the temperature of the substrate and the ambient temperature. The temperature difference with the environment is preferably 10–20 K, more preferably about 16 K.

In preference the reference chip is shielded from the measuring chip by an insulator. Because the measuring chip is significantly warmer than the reference chip, which is not heated but only measures the ambient temperature, the former could, by radiation, influence the temperature measurement in the reference chip. Because the circuit is embodied such that the temperature of the substrate depends on the temperature of the reference chip, an increase in this temperature could result in an increase in the temperature generated in the substrate by the measuring chip and thereby an increase of the temperature in the reference chip. Not only would the measurement hereby become unreliable, but the substrate would also be unnecessarily heated.

The insulator is preferably embodied in a conducting material, preferably with a coefficient of thermal conductivity of a minimum of 200 W/(m.K), preferably aluminum.

In order to protect the chip against light and electromagnetic radiation the substrate, which is manufactured for instance from ceramic material, is provided on the side on which the chip is situated with a layer of vapour-deposited silver and a glass layer. Light and electromagnetic radiation could have an adverse effect on the temperature measurement.

Similarly to the per se known device, the device according to the invention comprises a housing consisting of two substantially parallel discs placed at some mutual distance, between which is situated a measuring disc of smaller dimensions. According to the invention however, the substrate with the measuring chip is arranged in the measuring disc in the side thereof facing the one parallel disc, while a substrate with a reference chip is arranged in the side of the measuring disc facing the other, parallel disc.

In order to ensure that the reference chip detects substantially the same air flow as the measuring chip, the measuring disc is preferably placed on one of the two discs with interposing of a plurality of thin rods. The discs themselves are preferably held apart by a cylinder of gauze with a mesh width of 1–10 mm, preferably 2–5 mm and most preferably 2.48 mm, and a wire thickness of 0.1–2 mm, preferably 0.2–1 mm and most preferably 0.7 mm. The measuring disc is situated inside the cylinder. The gauze ensures that the air flow already becomes turbulent outside the measuring surface. In the absence of such a cylinder there is the possibility of the air flow transposing from laminar to turbulent above the chip. This could also have an adverse effect on the measurement results.

In a preferred embodiment the measuring disc is provided on its upper side with a recess for receiving therein the substrate with the measuring chip and on its underside with a recess for receiving therein the substrate with the reference chip. The dividing wall between both recesses serves as insulator.

BRIEF DESCRIPTION OF THE DRAWINGS

The present invention will be further elucidated on the basis of the accompanying drawings in which corresponding reference numerals refer to corresponding parts and in which.

DETAILED DESCRIPTION OF ILLUSTRATED EMBODIMENT

Figure 1:
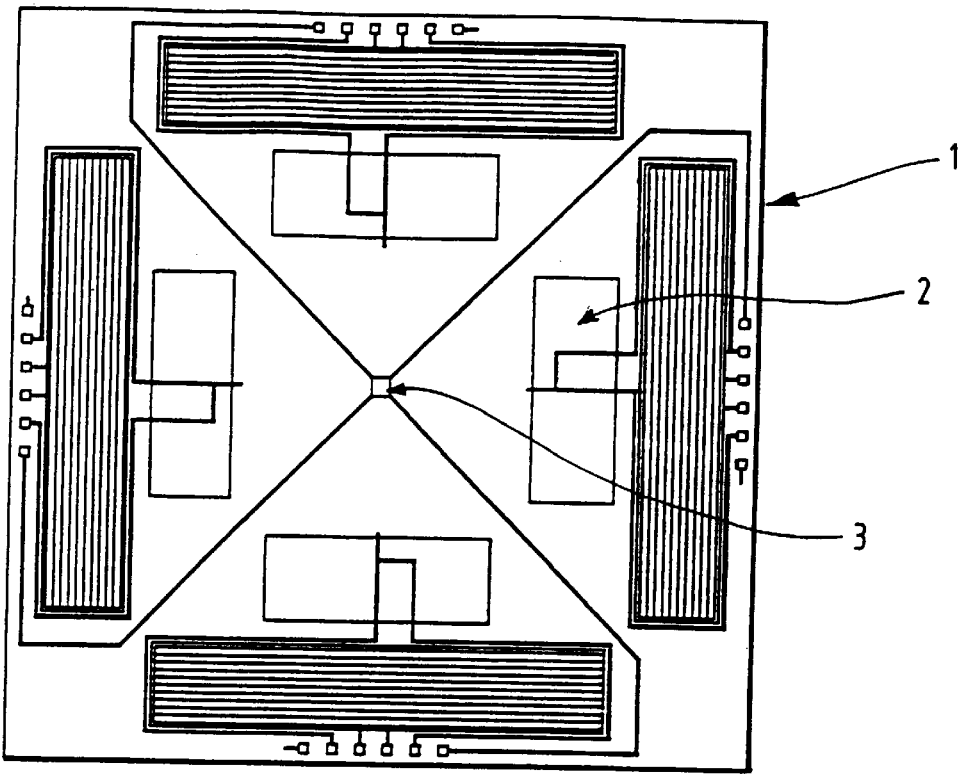
FIG. 1 shows a schematic view of the measuring chip according to the invention.

FIG. 1 shows the structure of the chip (also known as integrated circuit or IC), in which four thermopiles 1, four heating rheostats 2 and one transistor 3 are integrated. The shown IC is glued onto a ceramic substrate of for instance $Al_2O_3$, this in a manner such that substantially no air bubbles and other unevenness remain between the chip and the substrate. A plurality of conductors is also arranged on the substrate. In order to protect the IC against direct light and electromagnetic influences special layers are arranged on the substrate after arranging of the chip, such as a layer of vapourdeposited silver and a glass layer.

Figure 2:
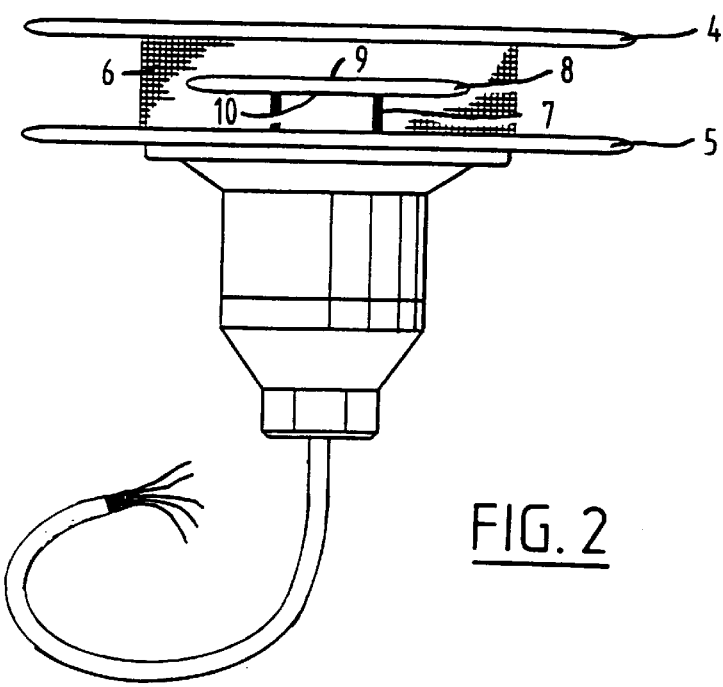
FIG. 2 shows a schematic view of a preferred embodiment of the device.

FIG. 2 shows a preferred embodiment of a device according to the invention. The device shown here consists of an upper disc 4 and a lower disc 5 which are held at a mutual distance by a cylinder of gauze 6. The measuring disc 8 is situated in the cylinder on thin rods 7. All three discs have rounded edges whereby the approach of the flow of air is facilitated. Situated in the top of the measuring disc 8 is a substrate 9 having a measuring chip thereon. In the bottom is situated a substrate 10 with the reference chip.

Figure 3:
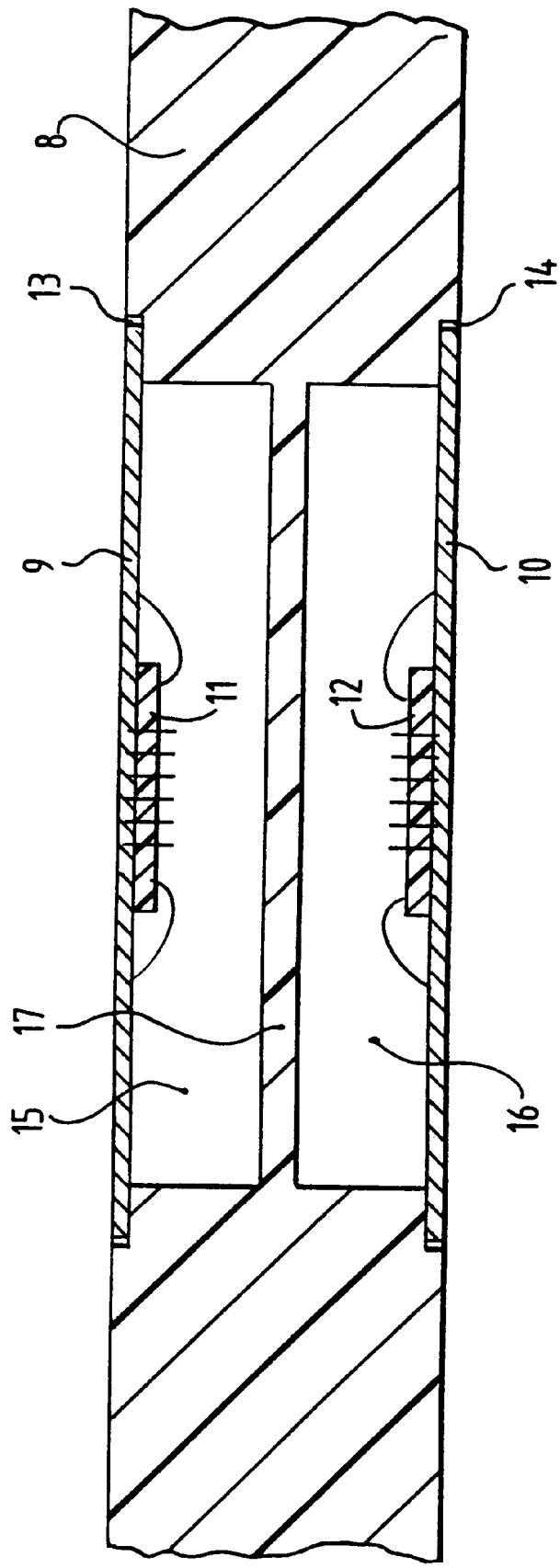
FIG. 3 shows a schematic cross section of a part of the measuring disc.

FIG. 3 shows an enlarged detail view of the measuring disc 8. Situated in the top is the substrate 9 with the measuring chip 11. The chip 11 is received in a recess 15 in the measuring disc and is thus shielded from the air flow which only makes contact with the side of the substrate remote from the chip.

The same applies to reference chip 12 which is received in a recess 16. In order not to disrupt the air flow the substrates are flush-mounted in the measuring disc. Substrate 9 is situated in a recess 13 and substrate 10 in a recess 14. Recesses 15 and 16 are mutually separated by means of a dividing wall 17 which is embodied in the same material as the rest of the measuring disc and serves as thermal insulator of the reference chip relative to the measuring chip.

The improvements according to the invention provide a better heat transfer between chip and substrate and substrate and environment, whereby an homogeneous heating of the substrate is obtained and the occurrence of hysteresis is prevented.

We claim:

1. Device for determining the direction and speed of an air flow, comprising a measuring chip which is provided with two mutually perpendicularly positioned pairs of measuring circuits placed at a distance opposite each other, one or more, preferably four, heating elements in positions coinciding with the measuring circuits and a control circuit, which chip is fixed onto a substrate, characterized in that the mounting between the chip and the substrate is substantially homogeneous.

2. Device as claimed in claim 1, characterized in that the mounting between the chip and the substrate is effected by gluing.

3. Device as claimed in claim 1, characterized in that the substrate with the chin thereon is accommodated in a housing of conducting material.

4. Device as claimed in claim 3, characterized in that the coefficient of thermal conductivity of the conducting material is a minimum of 200 W/(m.K).

5. Device as claimed in claim 3, characterized in that the conducting material is aluminum.

6. Device as claimed in claim 1, characterized in that the substrate is manufactured from ceramic material, is provided on the side containing the chip with a layer of vapor-deposited silver and a glass layer to protect the chip against light and electromagnetic radiation.

7. Device as claimed in claim 2 comprising a housing consisting of two substantially parallel discs placed at some mutual distance, between which is situated a measuring disc of smaller dimensions, characterized in that the substrate with the measuring chip is arranged in the measuring disc on the side thereof facing one of the parallel discs, and a substrate with a reference chip is arranged on the side of the measuring disc facing the other parallel disc.

8. Device as claimed in claim 7, characterized in that the discs are held apart by a cylinder of gauze with a mesh width of about 2.48 mm and a wire thickness of about 0.7 mm.

9. Device as claimed in claim 7, characterized in that the measuring disc is placed on one of the two discs with interposing of a plurality of thin rods.

10. Device as claimed in claim 7 characterized in that the measuring disc is provided on the upper side thereof with a recess for receiving therein the substrate with the measuring chip and is provided on the underside thereof with a recess for receiving therein the substrate with the reference chip.

11. Device as claimed in claim 1 which comprises, in addition to the measuring chip, a reference chip without active heating elements, characterized in that both the measuring chip and the reference chip are embodied in the device and exposed to the air flow in a substantially identical manner.

12. Device as claimed in claim 11 in which the reference chip is shielded from the measuring chip by an insulator, characterized in that the insulator is embodied in a thermally conducting material, preferably with a coefficient of thermal conductivity of a minimum of 200 W/(m.K), preferably aluminum.

* * * * *